United States Patent
Mukasa

(12) United States Patent (10) Patent No.: US 6,591,048 B2
(45) Date of Patent: Jul. 8, 2003

(54) DISPERSION COMPENSATING OPTICAL FIBER AND OPTICAL TRANSMISSION LINE USING THE OPTICAL FIBER

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 76 days.

(21) Appl. No.: 09/791,670

(22) Filed: Feb. 26, 2001

(65) Prior Publication Data

US 2001/0028491 A1 Oct. 11, 2001

Related U.S. Application Data

(63) Continuation of application No. PCT/JP00/04093, filed on Jun. 27, 2000.

(30) Foreign Application Priority Data

Jun. 25, 1999 (JP) .......................................... 11-179459

(51) Int. Cl.[7] .................................................. G02B 6/26
(52) U.S. Cl. ........................ 385/123; 385/126; 385/127
(58) Field of Search ................................. 385/123–128, 385/122; 359/161, 188, 195

(56) References Cited

U.S. PATENT DOCUMENTS

| | | | |
|---|---|---|---|
| 5,822,488 A | * 10/1998 | Yerasawa et al. | 385/127 |
| 5,852,701 A | * 12/1998 | Kato et al. | 385/127 |
| 5,995,695 A | * 11/1999 | Aikawa et al. | 385/123 |
| 5,999,679 A | * 12/1999 | Antos et al. | 385/127 |
| 6,072,929 A | * 6/2000 | Kato et al. | 385/123 |
| 6,233,387 B1 | * 5/2001 | Berkey et al. | 385/123 |
| 6,307,984 B1 | * 10/2001 | Watanabe | 385/24 |

OTHER PUBLICATIONS

Belov, A.V. et al.: Single–mode Sispersion Compensator for 1.31/1.55 Micrometer Long Haul Communication Lines;Conference on OpticalFiber Communication/Internatiional Conference on Integrated Optics and Optical Fiber Communication, Feb. 21–26, 1993, Technical Digest, vol. 4, pp. 203–204.*

* cited by examiner

Primary Examiner—Frank G. Font
Assistant Examiner—Michael P. Mooney
(74) Attorney, Agent, or Firm—Oblon, Spivak, McClelland, Maier & Neustadt, P.C.

(57) ABSTRACT

There are provided a dispersion compensating optical fiber that reduces dispersion in the 1.5 μm- and 1.3 μm-wavelength bands and an optical transmission line using the optical fiber. A first side core (2), a second side core (3), and a cladding (5) are disposed in this order on the outer side of a center core (1). The relationship among a comparative refractive index difference Δ1 of the center core (1) to the cladding (5), a comparative refractive index difference Δ2 of the first side core (2) to the cladding (5), and a comparative refractive index difference Δ3 of the second side core (3) to the cladding (5) is set to be Δ1>Δ3>Δ2 wherein $0.8\% \leq \Delta1 \leq 1.3\%$, $-0.5 \leq \Delta2/\Delta1 \leq -0.35$, and $0.2\% \leq \Delta3 \leq 0.3\%$, and the diameter ratio among the center core (1), the first side core (2), and the second side core (3) is set to be 1:2 through 2.5:2.5 through 3.5. The dispersion compensating optical fiber is connected to a single-mode optical fiber, and the dispersion value in the 1.5 μm-wavelength band of the connected optical fiber is set to be −1 ps/nm/km through 1 ps/nm/km, and the dispersion value in the 1.3 μm-wavelength band of the connected optical fiber is set to be −5 ps/nm/km through 5 ps/nm/km.

27 Claims, 2 Drawing Sheets

DISPERSION COMPENSATING OPTICAL FIBER AND OPTICAL TRANSMISSION LINE USING THE OPTICAL FIBER

This application is a continuation of PCT/JP00/04093, filed Jun. 22, 2000.

TECHNICAL FIELD

The present invention relates to a dispersion compensating optical fiber that is connected to, for example, a single-mode optical fiber having zero dispersion in the vicinity of a wavelength of 1.3 μm (hereinafter, referred to simply as single-mode optical fiber) and is used in making wavelength division multiplexing optical transmission by the use of light in a 1.5 μm wavelength band or other predetermined wavelength bands, and the invention relates to an optical transmission line that uses the dispersion compensating optical fiber.

BACKGROUND ART

Single-mode optical fibers have been constructed as a transmission network of optical communications all over the world. Nowadays, the amount of communications information is showing a tendency to increase sharply with the development of the information society. With the increase in information, wavelength division multiplexing transmission (WDM transmission) has been widely accepted in the field of telecommunications such that the era of the WDM transmission has now been entered. The WDM transmission is an optical transmission method suitable for large capacity high-speed communication because the WDM transmission can transmit light having a plurality of wavelengths by means of one optical fiber.

However, when the WDM transmission is made by the use of existing single-mode optical fibers and by the use of a signal light beam in a 1.3 μm-wavelength band, it does not coincide, in a wave range, with a 1.55 μm-wavelength band that is the gain band of a general optical amplifier using an erbium doped optical fiber. (Note that the 1.55 μm-wavelength band is a wavelength band substantially centering around a wavelength of 1550 nm, including wavelengths of, for example, 1530 nm to 1570nm; the term "1.55 μm-wavelength band" is hereinafter used with this meaning.) Thus, a problem resides in that the optical amplifier cannot be used, and an obstacle is caused to long distance optical communication (long distance optical transmission). Therefore, recently, WDM transmission has been made in the 1.55 μm-wavelength band using the existing single-mode optical fibers.

However, when optical communication is carried out in the 1.55 μm-wavelength band by using the existing single-mode optical fiber, the single-mode optical fiber usually has a positive dispersion of about 17 ps/nm/km in a wavelength of 1.55 μm that is substantially a center wavelength in the 1.55 μm-wavelength band, and, in addition, has a positive dispersion slope in the 1.55 μm-wavelength band. For this reason, a disadvantageous case occurred in which the waveform distortion of an optical signal becomes large as the optical signal propagates through the single-mode optical fiber, and, especially when the WDM optical transmission is made, it becomes difficult to separate/distinguish the signal on the signal receiving side, thus lowering the quality of the optical communication and destroying the reliability thereof.

Then, in order to resolve the problem, recently, a dispersion compensating optical fiber that has large negative dispersion in the 1.55 μm-wavelength band has been modularized and has been connected to the single-mode optical fiber transmission line, in order to compensate for the dispersion and the dispersion slope in the 1.55 μm-wavelength band by a short dispersion compensating optical fiber. This aims to enable the WDM transmission in the 1.55 μm-wavelength band by compensating the positive dispersion and the positive dispersion slope that the single-mode optical fiber has in the 1.55 μm-wavelength band so as to restrain the deterioration of a transmission signal caused by wavelength dispersion.

However, as described above, the conventional dispersion compensating optical fiber is designed to compensate for the dispersion and dispersion slope of the single-mode optical fiber by its short length, and therefore, generally, the mode field diameter in the 1.55 μm-wavelength band becomes small in design so as to easily cause a nonlinear phenomenon. Additionally, a problem resides in that a transmission loss in the 1.55 μm-wavelength band is enlarged to be 0.4 dB/km or more, and a polarization mode dispersion value (PMD value) in the 1.55 μm-wavelength band also reaches a relatively large value of $0.2$ ps/km$^{1/2}$ or more. The single-mode optical fiber is relatively excellent in low nonlinearity.

Today, there is a demand to increase the amount of communications information even more. However, if the WDM transmission uses only the 1.55 μm-wavelength band, there is a limit to the number of transmissible wavelengths, and a saturation state will eventually be reached. Therefore, there are demands for new optical transmission lines in which a 1.5 μm-wavelength band (i.e., a wavelength band of, for example, 1520 through 1620 nm, including the conventional 1.55 μm-wavelength band; the term "1.5 μm-wavelength band" is hereinafter used with this meaning) is made usable by extending a usable wavelength band used for the wavelength division multiplexing transmission to both sides of the conventional 1.55 μm-wavelength band (1530 through 1570 nm, for example), or a wavelength band (wavelength range) other than the 1.5 μm-wavelength band is also made usable.

However, if the conventional dispersion compensating optical fiber is connected to the single-mode optical fiber, the dispersion of, for example, wavelengths 1530 through 1570 nm in the 1.55 μm-wavelength band is compensated to be almost zero, but, instead, the dispersion in other wavelength ranges including a 1.3 μm-wavelength band that has shown almost zero dispersion before the connection to the conventional dispersion compensating optical fiber is displaced from the neighborhood of zero. The optical transmission line formed by connecting the conventional dispersion compensating optical fiber to the single-mode optical fiber in this way cannot serve as an optical transmission line capable of making the WDM transmission using the other wavelength ranges that include the 1.3 μm-wavelength band, for example.

Then, the present inventor has reoriented the conventional concept that the dispersion compensation of the single-mode optical fiber is merely carried out with the short dispersion compensating optical fiber, and has studied ways to realize an optical fiber provided with a function suitable for long distance optical transmission of the dispersion compensating optical fiber in such a way as to improve the characteristics of the mode field diameter, bend loss, and polarization mode dispersion of the dispersion compensating optical fiber itself in the 1.5 μm-wavelength band.

If such an optical fiber is realized, a problem caused by the nonlinearity can be controlled, and excellent signal transmission in the 1.5 μm-wavelength band can be made in the optical transmission line in which the single-mode optical fiber and the dispersion compensating optical fiber are connected to each other.

Additionally, the present inventor thought that an optical transmission line having small dispersion in a wavelength band, for example, near 1.3 μm that is a zero dispersion wavelength of the single-mode optical fiber will be formable if the dispersion characteristics of the dispersion compensating optical fiber to be connected to the single-mode optical fiber are made appropriate.

The present invention was made in consideration of the foregoing. A first object of the present invention is to provided a dispersion compensating optical fiber in which the characteristics of a mode field diameter, bend loss, polarization mode dispersion, etc., in the 1.5 μm-wavelength band are excellent, and, by connecting to a single-mode optical fiber or connecting to an optical fiber having almost the same dispersion characteristic in the 1.5 μm-wavelength band as the single-mode optical fiber, an optical signal can be transmitted for a long distance while compensating the dispersion in the 1.5 μm-wavelength band of light travelling through the optical fiber, and the dispersion can be reduced also in wavelengths other than the 1.5 μm wavelength band. A second object of the present invention is to provide an optical transmission line capable of, by using the aforementioned dispersion compensating optical fibers, making high-quality WDM transmission in which waveform distortion is controlled.

SUMMARY OF THE INVENTION

In order to achieve the objects, the present invention provides dispersion compensating optical fibers constructed as follows. That is, there is provided a dispersion compensating optical fiber used by connection to a single-mode optical fiber that has zero dispersion in the vicinity of a wavelength of 1.3 μm or by connection to a compensated optical fiber whose dispersion characteristic in a 1.5 μm-wavelength band is substantially the same as that of the single-mode optical fiber, the dispersion compensating optical fiber characterized in that a dispersion value in a predetermined wavelength band in the 1.5 μm-wavelength band of a connected optical fiber is set at −1 ps/nm/km through 1 ps/nm/km, and a dispersion value in one or more predetermined wavelength bands different from the predetermined wavelength band in the 1.5 μm-wavelength band is set at −5 ps/nm/km through 5 ps/nm/km.

As a feature of the present invention, the predetermined wavelength band different from the 1.5 μm-wavelength band in which the dispersion value of the connected optical fiber is set at −5 ps/nm/km through 5 ps/nm/km is a 1.3 μm-wavelength band.

According to another aspect of the present invention, there is provided a dispersion compensating optical fiber characterized in that a mode field diameter in a predetermined wavelength band in a 1.5 μm-wavelength band or a mode field diameter in a wavelength in the vicinity of a center of the predetermined wavelength band is 6.3 μm or more, and, by connection to a single-mode optical fiber that has zero dispersion in the vicinity of a wavelength of 1.3 μm or by connection to a compensated optical fiber whose dispersion characteristic in the 1.5 μm-wavelength band is substantially the same as that of the single-mode optical fiber, a dispersion value in the predetermined wavelength band in the 1.5 μm-wavelength band of a connected optical fiber is set at −1 ps/nm/km through 1 ps/nm/km.

According to still another aspect of the present invention, there is provided a dispersion compensating optical fiber characterized in that a mode field diameter in a predetermined wavelength band in a 1.5 μm-wavelength band or a mode field diameter in a wavelength in the vicinity of a center of the predetermined wavelength band is 5.5 μm or more, and a bend loss in a bend diameter of 20 mm in the predetermined wavelength band or in the wavelength in the vicinity of the center of the predetermined wavelength band is 3.0 dB/m or less, and, by connection to a single-mode optical fiber that has zero dispersion in the vicinity of a 1.3 μm wavelength or by connection to a compensated optical fiber whose dispersion characteristic in the 1.5 μm-wavelength band is substantially the same as that of the single-mode optical fiber, a dispersion value in the predetermined wavelength band in the 1.5 μm-wavelength band or in the vicinity of the center of the predetermined wavelength band of a connected optical fiber is set at −1 ps/nm/km through 1 ps/nm/km.

In the dispersion compensating optical fibers mentioned above, a dispersion value in the predetermined wavelength band in the 1.5 μm-wavelength band or a dispersion value in the wavelength in the vicinity of the center of the predetermined wavelength band is −20 ps/nm/km through 10 ps/nm/km, and a transmission loss in the predetermined wavelength band or in the wavelength in the vicinity of the center of the predetermined wavelength band is 0.25 dB/km or less, and, by connection to the single-mode optical fiber that has zero dispersion in the vicinity of a 1.3 μm wavelength or by connection to the compensated optical fiber whose dispersion characteristic in the 1.5 μm-wavelength band is substantially the same as that of the single-mode optical fiber, a dispersion value in the predetermined wavelength band in the 1.5 μm-wavelength band or in the vicinity of the center of the predetermined wavelength band of the connected optical fiber is set at −1 ps/nm/km through 1 ps/nm/km.

Preferably, a dispersion slope either in the predetermined wavelength in the 1.5 μm-wavelength band or in the 1.3 μm-wavelength band or a dispersion slope both in the predetermined wavelength in the 1.5 μm-wavelength band and in the 1.3 μm-wavelength band is negative.

In an aspect of the present invention, a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band or in the wavelength in the vicinity of the center of the predetermined wavelength band is set to be 20 dB/m or less.

Furthermore, the dispersion compensating optical fiber of the present invention is characterized in that a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band or in the wavelength in the vicinity of the center of the predetermined wavelength band is set to be 20 dB/m or less.

In another aspect of the present invention, the dispersion compensating optical fiber is characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.4\% \leq \Delta 2 \leq -0.2\%$ (or $-0.5 \leq \Delta 2/\Delta 1 \leq -0.35$), and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

Furthermore, according to the present invention, there is provided an optical transmission line whose dispersion value in a predetermined wavelength band in the 1.5 $\mu$m-wavelength band is −1 ps/nm/km through 1 ps/nm/km by connecting any one of the aforementioned dispersion compensating optical fibers to the single-mode optical fiber that has zero dispersion in the vicinity of a wavelength of 1.3 $\mu$m or to the compensated optical fiber whose dispersion characteristic in the 1.5 $\mu$m-wavelength band is substantially the same as that of the single-mode optical fiber.

In the optical transmission line according to an aspect of the present invention, a dispersion value in one or more predetermined wavelength bands different from the 1.5 $\mu$m-wavelength band is −5 ps/nm/km through 5 ps/nm/km, and a dispersion value in the 1.3 $\mu$m-wavelength band is −5 ps/nm/km through 5 ps/nm/km.

Preferably, the optical transmission line is connected by a fusion splice to the single-mode optical fiber that has zero dispersion in the vicinity of a wavelength of 1.3 $\mu$m or to the compensated optical fiber whose dispersion characteristic in the 1.5 $\mu$m-wavelength band is substantially the same as that of the single-mode optical fiber, and loss at a fusion splice 0.4 dB or less.

In another preferable form of the optical transmission line of the present invention, the dispersion compensating optical fiber is connected to the single-mode optical fiber that has zero dispersion in the vicinity of a wavelength of 1.3 $\mu$m or to the compensated optical fiber whose dispersion characteristic in the 1.5 $\mu$m-wavelength band is substantially the same as that of the single-mode optical fiber, with a dispersion shift optical fiber that has zero dispersion in the 1.5 $\mu$m-wavelength band interposed between the dispersion compensating optical fiber and the single-mode optical fiber or the compensated optical fiber, and a length of the dispersion shift optical fiber is 1/1000 times or less as long as the single-mode optical fiber or the compensated optical fiber connected to the dispersion compensating optical fiber, and a mode field diameter in the 1.5 $\mu$m-wavelength band of the dispersion shift optical fiber is larger than that of the dispersion compensating optical fiber and less than that of single-mode optical fiber or that of the compensated optical fiber.

By connecting the dispersion compensating optical fiber of the present invention as described above to the single-mode optical fiber or to the compensated optical fiber whose dispersion characteristic in the 1.5 $\mu$m-wavelength band is substantially the same as that of the single-mode optical fiber, the dispersion value in the predetermined wavelength band in the 1.5 $\mu$m-wavelength band is set at −1 ps/nm/km through 1 ps/nm/km. Accordingly, the dispersion in this wavelength band is compensated to be almost zero, and the dispersion value in one or more predetermined wavelength bands (the 1.3 $\mu$m-wavelength band, for example) different from the 1.5 $\mu$m-wavelength band becomes −5 ps/nm/km through 5 ps/nm/km, so that the dispersion value in the predetermined wavelength band becomes small to such an extent as not to exert a bad influence on wavelength division multiplexing transmission.

Therefore, by connecting the dispersion compensating optical fiber of the present invention to the single-mode optical fiber that has zero dispersion in the vicinity of a wavelength of 1.3 $\mu$m or to the compensated optical fiber whose dispersion characteristic in the 1.5 $\mu$m-wavelength band is substantially the same as that of the single-mode optical fiber, it becomes possible, not only in the predetermined wavelength band in the 1.5 $\mu$m-wavelength band but also in the other predetermined wavelength bands (1.3 $\mu$m-wavelength band, for example) different from the 1.5 $\mu$m-wavelength band, to make WDM transmission in which the distortion of a signal light beam caused by the distortion is small and is high in quality. This makes it possible to widen the wavelength range of the WDM transmission.

Additionally, the dispersion compensating optical fiber of the present invention is superior in terms of the characteristic of WDM transmission in a predetermined wavelength band in the 1.5 $\mu$m-wavelength band or in a wavelength in the vicinity of the center of the predetermined wavelength band in the 1.5 $\mu$m-wavelength band, and, by connecting the dispersion compensating optical fiber to the single-mode optical fiber that has zero dispersion in the vicinity of a wavelength of 1.3 $\mu$m or to the compensated optical fiber whose dispersion characteristic in the 1.5 $\mu$m-wavelength band is substantially the same as that of the single-mode optical fiber, the dispersion value in the predetermined wavelength band in the 1.5 $\mu$m-wavelength band of the connected optical fiber can be set to be −1 ps/nm/km through 1 ps/nm/km. Accordingly, it is possible to compensate for the dispersion of the single-mode optical fiber in the predetermined wavelength band in the 1.5 $\mu$m-wavelength band and that of the compensated optical fiber therein to be almost zero.

Therefore, by connecting the dispersion compensating optical fiber to the single-mode optical fiber or to the compensated optical fiber, high-quality long-distance transmission can be made in the predetermined wavelength band in the 1.5 $\mu$m-wavelength band while compensating the dispersion in this wavelength band of the single-mode optical fiber or the compensated optical fiber.

Furthermore, by connecting the dispersion compensating optical fiber of the present invention in which a transmission loss in a predetermined wavelength band in the 1.5 $\mu$m-wavelength band or in a wavelength in the vicinity of the center of the predetermined wavelength band in the 1.5 $\mu$m-wavelength band shows a small value of 0.25 dB/km or less either to the single-mode optical fiber or to the compensated optical fiber, high-quality long-distance transmission can be made in the predetermined wavelength band in the 1.5 $\mu$m-wavelength band while compensating the dispersion in this wavelength band of the single-mode optical fiber or the compensated optical fiber.

Furthermore, according to the dispersion compensating optical fiber of the present invention whose dispersion slope in the 1.5 $\mu$m-wavelength band is negative, it is possible to flatten the dispersion in the predetermined wavelength band in the 1.5 $\mu$m-wavelength band of the connected optical fiber, while compensating the positive dispersion slope in the predetermined wavelength band in the 1.5 μm-wavelength band of the single-mode optical fiber or the compensated optical fiber, by connecting the dispersion compensating optical fiber to the single-mode optical fiber or to the compensated optical fiber whose dispersion characteristic in the 1.5 μm-wavelength band is substantially the same as that of the single-mode optical fiber.

Furthermore, according to the dispersion compensating optical fiber of the present invention whose dispersion slope in the 1.3 μm-wavelength band is negative, it is possible to flatten the dispersion in the 1.3 μm-wavelength band of the connected optical fiber, while compensating the positive dispersion slope in the 1.3 μm-wavelength band of the single-mode optical fiber or the compensated optical fiber, by connecting the dispersion compensating optical fiber to the single-mode optical fiber or to the compensated optical fiber whose dispersion characteristic in the 1.5 μm-wavelength band is substantially the same as that of the single-mode optical fiber.

Furthermore, according to the dispersion compensating optical fiber of the present invention in which a transmission loss in a predetermined wavelength band in the 1.5 μm-wavelength band or in a wavelength in the vicinity of the center of the predetermined wavelength band is 0.30 dB/km or less, a polarization mode dispersion value in the predetermined wavelength band or in the wavelength in the vicinity of the center of the predetermined wavelength band is 0.15 ps/km$^{1/2}$ or less, and a bend loss in a bend diameter of 20 mm in the predetermined wavelength band or in the wavelength in the vicinity of the center of the predetermined wavelength band is 20 dB/m or less, the quality of WDM transmission in the predetermined wavelength band in the 1.5 μm-wavelength band can be improved, in addition to any advantageous effect of a first through tenth inventions mentioned above, because of the superiority of the WDM transmission characteristic in the predetermined wavelength band (1.55 μm-wavelength band, for example) in the 1.5 μm-wavelength band or in the wavelength in the vicinity of the center of the predetermined wavelength band.

Furthermore, according to the dispersion compensating optical fiber of the present invention in which the relations $\Delta 1 > \Delta 3 > \Delta 2$, $0.8\% \leq \Delta 1 \leq 1.3\%$ $-0.4 \leq \Delta 2 \leq -0.2\%$ (or $-0.5 \leq \Delta 2/\Delta 1 \leq -0.35$), and $0.2\% \leq \Delta 3 \leq 0.3\%$ are established, the refractive index profile of the dispersion compensating optical fiber that has the advantageous effect can be optimized.

Furthermore, since the optical transmission line of the present invention is formed by connecting the dispersion compensating optical fiber to the single-mode optical fiber or to the compensated optical fiber whose dispersion characteristic in the 1.5 μm-wavelength band is substantially the same as that of the single-mode optical fiber, the optical transmission line can restrict the waveform distortion caused by the dispersion in the predetermined wavelength band in the 1.5 μm-wavelength band while keeping the dispersion value in this wavelength band at −1 ps/nm/km through 1 ps/nm/km, and can make high-quality WDM transmission.

Especially, according to the optical transmission line of the present invention whose dispersion value in one or more predetermined wavelength bands different from the 1.5 μm-wavelength band is −5 ps/nm/km through 5 ps/nm/km, the waveform distortion caused by the dispersion in this predetermined wavelength band is restricted, thereby WDM transmission can be made, and the communication wavelength range can be widened.

Likewise, according to the optical transmission line of the present invention whose dispersion value in the 1.3 μm-wavelength band is −5 ps/nm/km through 5 ps/nm/km, the waveform distortion caused by the dispersion in the 1.3 μm-wavelength band is restricted, thereby WDM transmission can be made, and the communication wavelength range can be widened.

Furthermore, according to the optical transmission line of the present invention whose fusion splice loss between the single-mode optical fiber or the compensated optical fiber and the dispersion compensating optical fiber is 0.4 dB or less, the quality of the optical transmission is prevented from decreasing because of the fusion splice loss, and therefore WDM transmission of an even higher quality can be achieved.

Furthermore, according to the optical transmission line of the present invention connected through the medium of the dispersion shift optical fiber that has zero dispersion in the 1.5 μm-wavelength band, for the connection between the single-mode optical fiber or the compensated optical fiber and the dispersion compensating optical fiber, the dispersion shift optical fiber whose length is short and whose mode field diameter is intermediate between the mode field diameters of the aforementioned fibers is interposed therebetween, and therefore it is possible to reduce the connection loss of the optical fibers and make high-quality WDM transmission even if the mode field diameter of the dispersion compensating optical fiber is small.

BEST MODE FOR CARRYING OUT THE INVENTION

The present invention will be described in full detail with reference to the attached drawings showing embodiments of the present invention.

Figure 1:
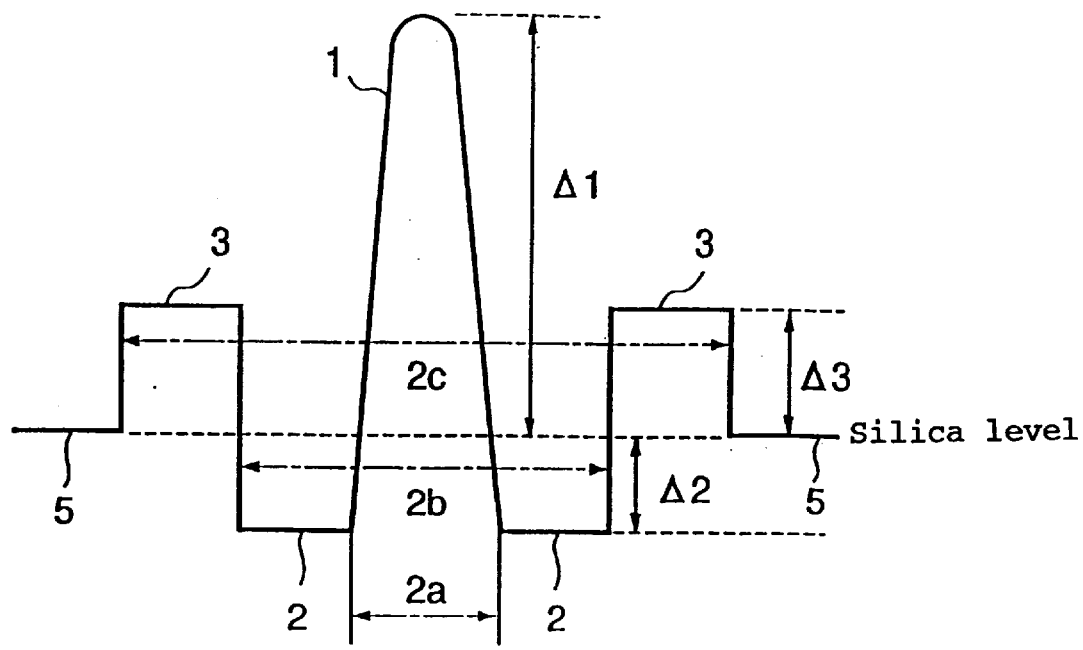
FIG. 1 is a schematic drawing of a main part showing a refractive-index profile example of an embodiment of a dispersion compensating optical fiber according to the present invention.

FIG. 1 shows refractive-index profiles of first and second embodiments of the dispersion compensating optical fiber of the present invention. The dispersion compensating optical fibers according to the first and second embodiments each have a refractive-index profile shown in this figure. These are each a dispersion compensating optical fiber in which the outer side of a center core 1 is covered with a first side core 2, the outer side of the first side core 2 is covered with a second side core 3, and the outer side of the second side core 3 is covered with a cladding 5.

First of all, the first embodiment will be described. A feature of the first embodiment is that the relationship among Δ1, Δ2, and Δ3 is expressed as Δ1>Δ3>Δ2 wherein Δ1 is a comparative refractive index difference of the center core 1 to the cladding 5, Δ2 is a comparative refractive index difference of the first side core 2 to the cladding 5, and Δ3 is a comparative refractive index difference of the second side core 3 to the cladding 5; Δ1, Δ2, and Δ3 are expressed as $0.8\% \leq \Delta 1 \leq 1.3\%$, $-0.4\% \leq \Delta 2 \leq -0.2\%$, and $0.2\% \leq \Delta 3 \leq 0.3\%$, respectively; the outer radius 2b of the first side core 2 is 2 through 2.5 times as large as the outer radius 2a of the center core 1, and the outer radius 2c of the second side core 3 is 2.5 through 3.5 times as large as the outer radius 2a of the center core 1.

The comparative refractive index differences Δ1, Δ2, and Δ3 are defined by the following formulas (1), (2), and (3), respectively:

$$\Delta 1 = [\{(n1)^2 - (nc)^2\}/2(n1)^2] \times 100 \quad (1)$$

$$\Delta 2 = [\{(n2)^2 - (nc)^2\}/2(n2)^2] \times 100 \quad (2)$$

$$\Delta 3 = [\{(n3)^2 - (nc)^2\}/2(n3)^2] \times 100 \quad (3)$$

wherein, on the assumption that the refractive index of a vacuum is 1, n1 is the comparative refractive index of the center core 1, n2 is the comparative refractive index of the first side core 2, nc is the comparative refractive index of the outer cladding 5, and, as mentioned above, the unit is %.

In this embodiment, the first side core 1 is shown as an α-th power profile (i.e., a refractive index shape exhibits a curve profile of y=−x$^\alpha$ that centers the center portion of the center core 1), and an α constant is 1.5 through 3.

The present embodiment has the distinctive refractive-index profile, and, accordingly, is characterized in that, by the connection to a single-mode optical fiber, a dispersion value in a predetermined wavelength band in the 1.5 μm-wavelength band of an optical fiber that has been connected to the single-mode optical fiber is −1 ps/nm/km through 1 ps/nm/km. Additionally, the present embodiment is characterized in that a dispersion slope in a predetermined wavelength band in the 1.5 μm-wavelength band is negative, and, by the connection to the single-mode optical fiber, the dispersion slope in the predetermined wavelength band in the 1.5 μm-wavelength band is compensated.

Additionally, in the present embodiment, each characteristic of wavelengths in the predetermined wavelength band in the 1.5 μm-wavelength band or each characteristic of wavelengths in the vicinity of the center of the predetermined wavelength band in the 1.5 μm-wavelength band has at least one of the following characteristics ① to ④: ① The mode field diameter is 6.3 μm or more; ② the mode field diameter is 5.5 μm or more, and the bend loss is 3.0 dB/m or less when the bend diameter is 20 mm; ③ the dispersion value is −20 ps/nm/km through 10 ps/nm/km, and the transmission loss is 0.25 dB/km or less; and ④ the transmission loss is 0.30 dB/km or less, the polarization mode dispersion value is 0.15 ps/km$^{1/2}$ or less, and the bend loss is 20 dB/m or less when the bend diameter is 20 mm.

In order to specify the refractive-index profile of the present embodiment of the invention, the present inventor conducted the following examinations. In detail, the refractive-index profile of an optical fiber that has negative dispersion and a negative dispersion slope in the 1.5 μm-wavelength band was examined to enable both the dispersion and the dispersion slope in the 1.5 μm-wavelength band of a single-mode optical fiber to be compensated, because the single-mode optical fiber has large dispersion in the 1.5 μm-wavelength band, and, at the same time, has a positive dispersion slope therein. As a result, it was understood that the refractive-index profile of the dispersion compensating optical fiber is effective in the state shown in FIG. 1.

Then, it was decided that the refractive-index profile of the present embodiment was to be a three-layer core type, as shown in FIG. 1, and concrete values of the comparative refractive-index differences Δ1, Δ2, and Δ3, and each core radius 2a, 2b, and 2c were decided in the following way.

That is, an important requirement (i.e., required dispersion-compensation performance) that is required of the dispersion compensating optical fiber is that low dispersion is achieved within the wide range of the 1.5 μm-wavelength band when connecting to the single-mode optical fiber, and, by bringing the dispersion compensating percentage shown in the following formula (4) into close proximity with 100%, the evenness of the dispersion can be obtained so as to achieve excellent dispersion compensation performance. In other words, it becomes possible to form an optical transmission line of wide-range zero dispersion as the dispersion compensating percentage reaches 100%.

$$\text{Compensating Percentage} = \{S(DCF)/S(SMF)\}/\{D(DCF)/D(SMF)\} \times 100 \quad (4)$$

wherein S(DCF) is a mean value of a dispersion slope in a used wavelength band (e.g., a wavelength band that has a predetermined range in the 1.5 μm-wavelength band) of a dispersion compensating optical fiber, S(SMF) is a mean value of the dispersion slope in the used wavelength band of a single-mode optical fiber, D(DCF) is a dispersion value in a predetermined wavelength (e.g., wavelength 1.55 μm in the case of the 1.55 μm-wavelength band) in the used wavelength band of the dispersion compensating optical fiber, and D(SMF) is a dispersion value in the predetermined wavelength of the single-mode optical fiber.

It has been proved from the conventional considerations that, in the dispersion compensating optical fiber of a refractive-index profile shown in FIG. 1, a dispersion compensating percentage near 100% can be obtained if the ratio (Δ2/Δ1) of the comparative refractive index difference Δ2 to the comparative refractive index difference Δ1 is set at about −0.3. Therefore, the present inventor assumed the aforementioned ratio Δ2/Δ1 as −0.3% so as to allow the compensating percentage to be nearly 100%.

Additionally, since there is a tendency for the nonlinear refractive index n$_2$ to increase and, at the same time, for the mode field diameter to decrease when Δ1 is enlarged, Δ1 was assumed as 1%, and the mode field diameter in a predetermined wavelength band in the 1.5 μm-wavelength band was set to be enlarged. Additionally, the ratio among the radius of the center core 1, the radius of the first side core 2, and the radius of the second side core 3 was assumed as a:b:c=1:2:3, and an optical fiber characteristic when Δ3 was changed was obtained by simulations. The result is shown in Table 1.

TABLE 1

| Δ3 % | Core radius μm | λc nm | Dispersion ps/nm/km | Dispersion slope ps/nm²/km | compensating percentage % | MFD μm | Aeff μm² | β/k |
|---|---|---|---|---|---|---|---|---|
| 0.15 | 17.2 | 1168 | −14.3 | −0.050 | 99.7 | 6.12 | 29.6 | 1.44556 |
| 0.20 | 16.7 | 1339 | −20.9 | −0.076 | 101.3 | 6.58 | 32.0 | 1.44561 |
| 0.25 | 16.3 | 1485 | −34.9 | −0.125 | 100.6 | 6.85 | 40.8 | 1.44564 |
| 0.30 | 16.0 | 1570 | −38.3 | −0.136 | 99.5 | 6.81 | 39.9 | 1.44564 |

In Table 1, "λc" is a cutoff wavelength, "dispersion" is wavelength dispersion in a wavelength of 1.55b μm, "dispersion slope" is a dispersion slope in a wavelength of 1.55 μm, "MFD" is a mode field diameter in a wavelength of 1.55 μm, "Aeff" is an effective core sectional area (usable core sectional area) in a wavelength of 1.55 μm, and "β/k" is a propagation refractive index (indication that shows the goodness of a propagation condition) in a wavelength of 1.55 μm. And, "compensating percentage" is a value obtained from Formula (4).

As is apparent from Table 1, regardless of whether Δ3 is 0.15%, 0.20%, 0.25%, or 0.30%, the compensating percentage has a value close to 100%, and, when Δ3 is 0.25%, the mode field diameter in a wavelength of 1.55 μm becomes maximum. With this, the effective core sectional area also reaches maximum, and low nonlinearity is achieved. At the same time, the propagation refractive index (β/k) in a wavelength of 1.55 μm also reaches the highest value of 1.4456 or more, which is most superior also in propagation characteristic.

It is known that the size of the comparative refractive index difference Δ2 influences the dispersion characteristic of an optical fiber, and, when the absolute value of Δ2 is enlarged, the compensating percentage shown in Formula (4) has a large value. On the other hand, it is also known that, when the absolute value of the comparative refractive index difference Δ2 is enlarged excessively, the flexural properties of the optical fiber worsens rapidly from some point. Then, in the aforementioned consideration, the present inventor assumed the ratio Δ2/Δ1 as a constant.

Figure 2:
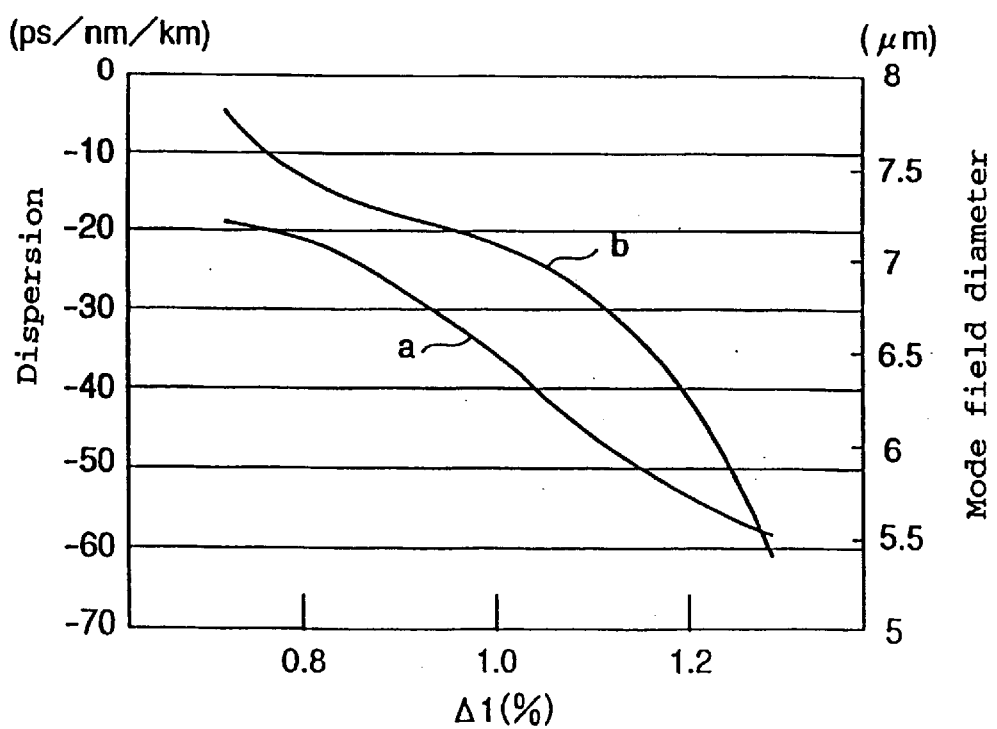
FIG. 2 is a graph showing an example of the variation of the dispersion in a wavelength of 1.55 μm of the dispersion compensating optical fiber when Δ1 is changed in the refractive-index profile shown in FIG. 1 and showing an example of the variation of a mode field diameter thereof.

Thereafter, Δ2Δ1 was assumed as −0.3, and, assuming that Δ3 is 0.25% which is the optimum value obtained from Table 1, an examination was made of how the mode field diameter and the dispersion value in a wavelength of 1.55 μm changes while changing the difference Δ1. At this time, the compensating percentage was set to be near 100% by adjusting the ratio a:b:c. This examination result is shown in FIG. 2, wherein the dispersion value is indicated by characteristic line a, and the mode field diameter is indicated by characteristic line b.

As is apparent from this figure, when the comparative refractive index difference Δ1 is changed within the range of about 1%, the mode field diameter in a wavelength of 1.55 μm increases as the difference Δ1 is reduced, so that the dispersion becomes small. Additionally, the cutoff wavelength also becomes short as the difference Δ1 is reduced.

Then, an examination was made of the range of Δ1 in which the mode field diameter in a predetermined wavelength band in the 1.5 μm-wavelength band reaches 5.5 μm or more on the condition that the cutoff wavelength meets a single mode requirement, and the bend loss in the bend diameter of 20 mm in the predetermined wavelength band in the 1.5 μm-wavelength band becomes 3.0 dB/m or less. As a result, it was proved that the mode field diameter in the predetermined wavelength band in the 1.5 μm-wavelength band has a high possibility of reaching 5.5 μm or more when Δ1 is within 0.8% through 1.3% (especially 1.0% through 1.3%). Additionally, it was also proved that the mode field diameter in the predetermined wavelength band in the 1.5 μm-wavelength band can be adjusted to be 6.3 μm or more when Δ1 is within 0.8% through 1.3% (especially 0.8% through 1.1%) if the bend loss is allowed to be about 10 dB/m on the condition that the cutoff wavelength meets the single mode requirement.

Even in this examination, the value of a:b:c was adjusted so as to compensate for the dispersion and the dispersion slope in the predetermined wavelength band in the 1.5 μm-wavelength band of the single-mode optical fiber by a compensating percentage close to 100%. As a result, a high compensating percentage of 90% or more was obtained when a:b=1:2 through 1:2.5, i.e., when the outer diameter of the first side core 2 is 2 to 2.5 times as large as the outer diameter of the center core 1, and a high compensating percentage of 80% or more was obtained, and, further, the cutoff wavelength reached 1500 nm or less without inviting an increase in the bend loss when a:c=1:2.5 through 1:3.5, i.e., when the outer diameter of the second side core 3 is 2.5 to 3.5 times as large as the outer diameter of the center core 1.

Therefore, based on the examination results, in this embodiment, the differences Δ1, Δ2, and Δ3 were set to be $0.8\% \leq \Delta 1 \leq 1.3\%$, $-0.4\% \leq \Delta 2 \leq -0.2\%$, and $0.2\% \leq \Delta 3 \leq 0.3\%$, the outer diameter 2b of the first side core 2 was set to be 2 to 2.5 times as large as the outer diameter 2a of the center core 1, and the outer diameter 2c of the second side core 3 was set to be 2.5 to 3.5 times as large as the outer diameter 2a of the center core 1, as mentioned above.

If the α constant showing the shape of the center core 1 is set at 1.5 through 3, the compensating percentage can come close to 100%, and the bend loss in wavelength 1.5 μm can be adjusted to be less than 10 dB/m. On the other hand, if the α constant is set to be less than 1.5, the bend loss increases, and, if the α constant is set to be more than 3, the compensating percentage worsens. Accordingly, in this embodiment, the α constant was set at 1.5 through 3.

According to this embodiment, since the refractive-index profile was optimized based on the aforementioned examination results, it is possible to compensate for the dispersion and the dispersion slope of the single-mode optical fiber in the 1.5 μm-wavelength band, and thereby adjust the dispersion slope also in a predetermined wavelength band in the 1.5 μm-wavelength band to be almost zero while setting the dispersion value in the predetermined wavelength band in the 1.5 μm-wavelength band of the optical fiber that has been connected thereto at −1 ps/nm/km through 1 ps/nm/km. At the same time, it is possible to enlarge the mode field diameter in the predetermined wavelength band in the 1.5 μm-wavelength band of the dispersion compensating optical fiber itself, thereby make it a low nonlinear dispersion compensating optical fiber, and restrict the bend loss, transmission loss, and polarization mode dispersion of the dispersion compensating optical fiber itself.

In other words, according to this embodiment, it is possible to allow the dispersion compensating optical fiber to be a dispersion compensating optical fiber having both a function of compensating the dispersion of the single-mode optical fiber and a function of suiting long distance optical transmission or WDM optical transmission. For example, by connecting the dispersion compensating optical fiber of this embodiment that has the same length as the single-mode optical fiber, it is possible to reduce the distortion of a waveform caused by the wavelength dispersion, and construct a high-quality long-distance transmissible optical transmission line that has less waveform distortion caused by a nonlinear phenomenon, less waveform distortion caused by polarization mode dispersion, less bend loss, and less transmission loss.

In order to confirm the effect of this embodiment, the present inventor made, for trial purposes, dispersion compensating optical fibers of concrete examples 1 and 2 that have the respective values of Δ1, α, Δ2, Δ3, and a:b:c as shown in Table 2, based on the simulation result, and obtained the characteristics of the dispersion compensating optical fibers of concrete examples 1 and 2. The result is shown in Table 3.

TABLE 2

| Unit | $\Delta 1$ % | $\alpha$ | $\Delta 2$ % | $\Delta 3$ % | a:b:c |
|---|---|---|---|---|---|
| Concrete Example 1 | 1.11 | 2.0 | −0.38 | 0.20 | 1:2.2:3 |
| Concrete Example 2 | 0.80 | 2.5 | −0.25 | 0.25 | 1:2.2:3 |

TABLE 3

| Unit | Despersion ps/nm/km | Dispersion slope ps/nm$^2$/km | Compensating percentage % | MFD $\mu$m | Bend loss dB/m | $\lambda$c nm | Transmission loss dB/km | PMD ps/km$^{1/2}$ |
|---|---|---|---|---|---|---|---|---|
| Conc. Ex.1 | −19.63 | −0.067 | 97.2 | 5.71 | 0.2 | 1357 | 0.225 | 0.042 |
| Conc. Ex.2 | −14.96 | −0.052 | 98.9 | 7.12 | 7.9 | 1014 | 0.245 | 0.061 |

In Table 3, "Dispersion", "Dispersion slope", "Compensating percentage", "MFD", and "λc" are the same as Table 1. "Bend loss" is a bend loss in a bend diameter of 20 mm in a wavelength of 1.55 μm, "Transmission loss" is a transmission loss in a wavelength of 1.55 μm, and "PMD" is polarization mode dispersion in a wavelength of 1.55 μm.

As is apparent from Table 3, the dispersion slope in the predetermined wavelength band in the 1.5 μm-wavelength band is negative in either of the dispersion compensating optical fibers of concrete examples 1 and 2, and the respective characteristics in a wavelength of 1.55 μm are as follows. That is, the dispersion value is within the range of −20 ps/nm/km through 10 ps/nm/km, the transmission loss is 0.25 dB/km or less, the mode field diameter is 5.5 μm or more, the bend loss in the bend diameter of 20 mm is 3.0 dB/m or less, and the polarization mode dispersion value is 0.15 ps/km$^{1/2}$ or less.

Thus, in a wavelength of 1.55 μm that is a center wavelength of the predetermined wavelength band (herein, it is the 1.55 μm-wavelength band) in the 1.5 μm-wavelength band, both concrete examples 1 and 2 show optical fibers that are excellent in the aforementioned optical transmission characteristics, therefore excellent in optical transmission characteristics in the 1.5 μm-wavelength band, and especially excellent in the role as an optical transmission line for long distance transmission or wavelength division multiplexing transmission.

Additionally, in concrete examples 1 and 2, the compensating percentage is nearly 100%, and the dispersion value in a wavelength of 1.55 μm is opposite in mathematical symbol to and is almost the same in the absolute value as about 17 ps/nm/km that is the dispersion value in a wavelength of 1.55 μm of the single-mode optical fiber. Therefore, it has been confirmed that, by connecting the single-mode optical fiber to the dispersion compensating optical fiber in such a way that the length ratio of the fiber to the other one is substantially 1:1, the dispersion value in the predetermined wavelength band in the 1.5 μm-wavelength band of the optical fiber that has been connected can be set at −1 ps/nm/km through 1 ps/nm/km.

Now, a description will be given of a second embodiment of the dispersion compensating optical fiber according to the present invention. The refractive-index profile of the second embodiment is constructed in almost the same way as the refractive-index profile of the first embodiment. A feature of the refractive-index profile of the second embodiment is that the ratio (Δ2/Δ1) of the comparative refractive index difference Δ2 between the first side core 2 and the cladding 5 to the comparative refractive index difference Δ1 between the center core and the aforementioned cladding is set to be −0.5 or more and −0.35 or less. It is noted that, in the second embodiment, there is also a case in which the value of Δ2 is set to be less than −0.4%, in order to do this.

The second embodiment is characterized in that, since it has the aforementioned distinctive refractive-index profile, when connecting to the single-mode optical fiber that has zero dispersion at 1.3 μm, a dispersion value in the predetermined wavelength band in the 1.5 μm-wavelength band of the optical fiber that has been connected thereto is set as −1 ps/nm/km through 1 ps/nm/km, and a dispersion value in the 1.3 μm-wavelength band that is a predetermined wavelength band different from the 1.5 μm-wavelength band is set as −5ps/nm/km through 5 ps/nm/km.

From the fact that demands have been recently made to increase the quantity of communications information even more, as mentioned above, and there are demands for a new optical transmission line that can also use wavelength bands (wavelength ranges) other than the 1.55 μm-wavelength band for wavelength division multiplexing transmission, and, additionally, the single-mode optical fiber has low nonlinearity, the present inventor intended, by using effectively the excellent low nonlinearity of the single-mode optical fiber and making a connection between the single-mode optical fiber and the dispersion compensating optical fiber, to form a dispersion compensating optical fiber that can use both the 1.5 μm-wavelength band and the 1.3 μm-wavelength band including the neighborhood of a wavelength of 1.3 μm that is a zero dispersion wavelength of the single-mode optical fiber for wavelength division multiplexing transmission.

And, since the magnitude of the comparative refractive index difference Δ2 seemed to most strongly influence the dispersion characteristic of the optical fiber in a refractive-index profile such as that shown in FIG. 1, the absolute value of the comparative refractive index difference Δ2 was enlarged, and the ratio (Δ2/Δ1) between the comparative refractive index difference Δ1 of the center core to the cladding and the comparative refractive index difference Δ2 of the first side core 2 to the cladding 5 was set at −0.5 through −0.35, in order to specify the refractive-index profile of the second embodiment. Thereafter, for this, examination was made as to the dispersion and the dispersion slope in a wavelength of 1.55 μm, the dispersion and the dispersion slope in a wavelength of 1.31 μm, and the dispersion value of the single-mode optical fiber and the dispersion compensating optical fiber that had been connected to each other. The result is shown in Table 4.

In Table 4, "1.55 dispersion" is a dispersion value in a wavelength of 1.55 μm, "1.55 slope" is a dispersion slope in a wavelength of 1.55 μm, "Compensating percentage" is a value obtained from Formula (4), "1.31 dispersion" is a dispersion value in a wavelength of 1.31 μm, "1.31 slope" is a dispersion slope in a wavelength of 1.31 μm, and "After-connection dispersion" is a dispersion value in a wavelength of 1.31 μm of the optical fiber that has been connected.

It has been proved that, if the ratio Δ2/Δ1 is set to be −0.5 or more and −0.35 or less, the compensating percentage in the predetermined wavelength band in the 1.5 μm-wavelength band can be adjusted to be nearly 100%, and, by fixing the length of the dispersion compensating optical fiber whereby the dispersion and the dispersion slope in the predetermined wavelength band in the 1.5 μm-wavelength band of the single-mode optical fiber can be compensated almost completely, the dispersion value in the 1.3 μm-wavelength band is set at −5 ps/nm/km through 5 ps/nm/km so as to reduce the absolute value of the dispersion, and, as a result, characteristics usable for wavelength division multiplexing transmission can be obtained.

Table 7 shows also the results of the dispersion value (after-connection dispersion) and the dispersion slope (after-connection dispersion slope) in the 1.3 μm-wavelength band of the connected optical fiber when the dispersion compensating optical fiber of concrete example 3 that is long enough to compensate almost completely the dispersion and the dispersion slope of the single-mode optical fiber in the predetermined wavelength band in the 1.5 μm-wavelength band is connected to the single-mode optical fiber.

As is apparent from Tables 6 and 7, it has been confirmed that the dispersion compensating optical fiber of concrete example 3 can make the compensating percentage in a wavelength of 1.55 μm nearly 100%, and, by connecting the dispersion compensating optical fiber by the aforementioned length to the single-mode optical fiber, the dispersion value

TABLE 4

| Δ1 % | Δ2 % | 1.55 dispersion ps/nm/km | 1.55 slope ps/nm$^2$/km | Compensating percentage % | 1.31 dispersion ps/nm/km | After-connection dispersion ps/nm/km | 1.31 slope ps/nm$^2$/km |
|---|---|---|---|---|---|---|---|
| 1.25 | −0.53 | −164.0 | −0.603 | 103.3 | −18.7 | −1.65 | −0.007 |
| 1.11 | −0.47 | −118.7 | −0.404 | 95.6 | −31.2 | −3.62 | −0.056 |
| 0.92 | −0.43 | −74.5 | −0.275 | 102.9 | −20.8 | −3.68 | 0.018 |
| 0.80 | −0.39 | −32.0 | −0.114 | 100.4 | −6.81 | −2.31 | 0.034 |

Thereafter, based on the simulation result, the dispersion compensating optical fiber of concrete example 3 in which Δ1, Δ2, and Δ3 have values shown in Table 5 was experimentally made by the length of 20 km, as shown in Tables 6 and 7, and both the characteristic in the 1.5 μm-wavelength band of the dispersion compensating optical fiber of concrete example 3 and the characteristic in the 1.3 μm-wavelength band thereof were sought. The characteristic in the 1.5 μm-wavelength band of concrete example 3 and the characteristic in the 1.3 μm-wavelength band thereof are shown in Table 6 and Table 7, respectively.

and the dispersion slope in a wavelength of 1.3 μm of the connected optical fiber can be set at −2.69 ps/nm/km and −0.0525 ps/nm$^2$/km, respectively, so as to become small enough to use it for wavelength division multiplexing transmission.

According to the second embodiment, since the compensating percentage in a wavelength of 1.55 μm can be made nearly 100% as mentioned above, an optical transmission line capable of making WDM transmission can be formed in a predetermined wavelength band in the 1.5 μm-wavelength band of the connected optical fiber whose dispersion value is within the range of −1 ps/nm/km through 1 ps/nm/km, and this optical transmission line can be used for WDM transmission also in a predetermined wavelength band in the 1.3 μm-wavelength band whose dispersion value is within the range of −5 ps/nm/km through 5 ps/nm/km.

In other words, in both the 1.5 μm-wavelength band and the 1.3 μm-wavelength band, an optical transmission line capable of making high-quality WDM transmission in which

TABLE 5

| Unit | Δ1 % | Δ2 % | Δ3 % |
|---|---|---|---|
| Concrete example 3 | 1.11 | −0.47 | 0.20 |

TABLE 6

| Unit | Length km | Transmission loss dB/km | Dispersion ps/nm/km | Dispersion slope ps/nm$^2$/km | MFD μm | Bend loss dB/m | λc nm | Compensating percentage % |
|---|---|---|---|---|---|---|---|---|
| Conc. Ex. 3 | 20.0 | 0.250 | −125.1 | −0.446 | 5.45 | 18.2 | 1347 | 93.0 |

TABLE 7

| Unit | Length km | Transmission loss dB/km | Dispersion ps/nm/km | After-connection dispersion ps/nm/km | Dispersion slope ps/nm$^2$/km | After connection dispersion slope ps/nm$^2$/km | MFD μm |
|---|---|---|---|---|---|---|---|
| Conc. Ex. 3 | 20.0 | 0.355 | −23.1 | −2.69 | −0.0426 | −0.0525 | 4.75 | the waveform distortion caused by dispersion is small can be constructed by connecting the dispersion compensating optical fiber of the second embodiment to the single-mode optical fiber, thus making it possible to widen the wavelength range of WDM transmission.

Next, a description will be given of a first embodiment of an optical transmission line that uses the dispersion compensating optical fiber according to the present invention. The optical transmission line of the first embodiment is characterized in that the line is formed by fusion-splicing any one of the dispersion compensating optical fibers shown in the aforementioned first embodiment to the single-mode optical fiber, and thereby the dispersion value in a predetermined wavelength band in the 1.5 μm-wavelength band is within the range of −1 ps/nm/km through 1 ps/nm/km. In the first embodiment, the fusion splice loss between the dispersion compensating optical fiber and the single-mode optical fiber is 0.4 dB or less.

The optical transmission line of the first embodiment is constructed as above, and the dispersion value in the predetermined wavelength band in the 1.5 μm-wavelength band is set at −1 ps/nm/km through 1 ps/nm/km. Therefore, in the 1.5 μm-wavelength band, it is possible to make an optical transmission that has small waveform distortion. Additionally, in the optical transmission line of this embodiment, the fusion splice loss between the dispersion compensating optical fiber and the single-mode optical fiber has a small value of 0.4 dB or less, and the dispersion compensating optical fiber of the first embodiment used for the optical transmission line has a large mode field diameter in the predetermined wavelength band in the 1.5 μm-wavelength band and is excellent in the transmission loss characteristic and in the bend loss characteristic so as to be suitable as an optical transmission line. Therefore, it can be an optical transmission line capable of making high-quality WDM transmission that is small in, for example, waveform distortion caused by a nonlinear phenomenon.

Concerning the effective core sectional area in the 1.5 μm-wavelength band, the single-mode optical fiber is larger than the dispersion compensating optical fiber. Therefore, by disposing the single-mode optical fiber on the incident side of a signal light beam and by connecting the dispersion compensating optical fiber to the signal-beam-emitting side of the single-mode optical fiber, it is possible to let a beam of light that has become small in intensity during the propagation through the single-mode optical fiber to enter the dispersion compensating optical fiber. Therefore, it can be an optical transmission line that can restrict a nonlinear phenomenon even more.

Next, a description will be given of a second embodiment of the optical transmission line that uses the dispersion compensating optical fiber according to the present invention. The optical transmission line of the second embodiment is formed by fusion-splicing any one of the dispersion compensating optical fibers (of Tables 4 and 5) shown in the aforementioned second embodiment to the single-mode optical fiber, and thereby the dispersion value in a predetermined wavelength band in the 1.5 μm-wavelength band is within the range of −1 ps/nm/km through 1 ps/nm/km, and the dispersion value in the 1.3 μm-wavelength band is within the range of −5 ps/nm/km through 5 ps/nm/km. Also in the optical transmission line of the second embodiment, the fusion splice loss between the dispersion compensating optical fiber and the single-mode optical fiber is 0.4 dB or less.

Like the optical transmission line of the first embodiment, that of the second embodiment has the dispersion value of −1 ps/nm/km through 1 ps/nm/km in the predetermined wavelength band in the 1.5 μm-wavelength band. Therefore, in the 1.5 μm-wavelength band, it is possible to make an optical transmission that has small waveform distortion caused by dispersion. Furthermore, in the optical transmission line of the second embodiment, the dispersion value in the 1.3 μm-wavelength band is set at −5 ps/nm/km through 5 ps/nm/km. Therefore, not only in the 1.5 μm-wavelength band but also in the 1.3 μm-wavelength band, it is possible to make an optical transmission that is small in waveform distortion caused by the dispersion.

Figure 3:
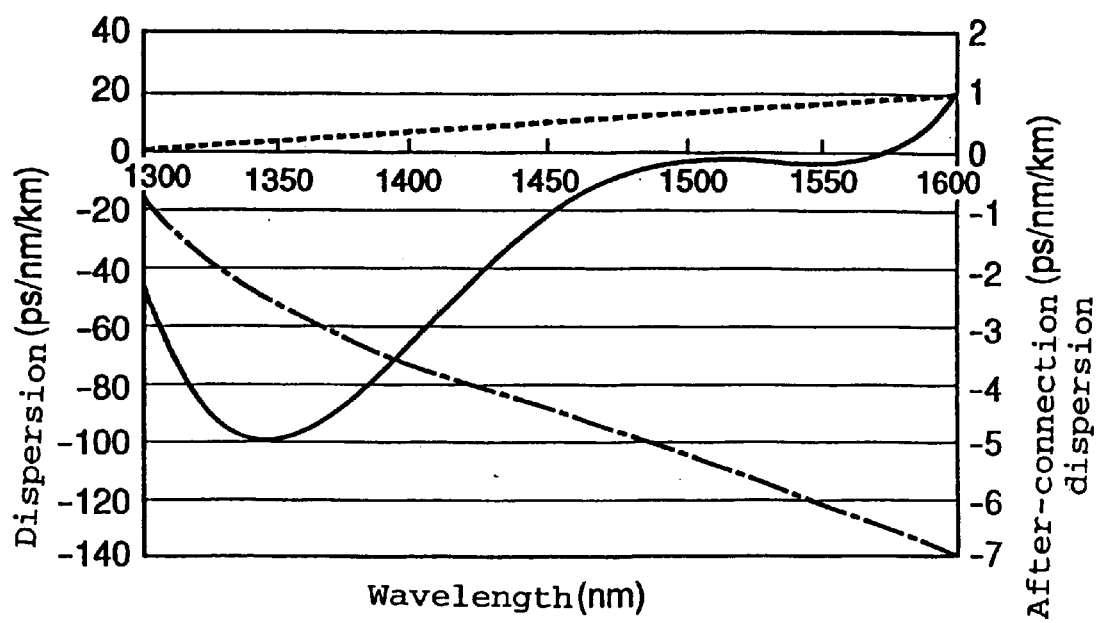
FIG. 3 is a graph showing the dispersion characteristic of the optical transmission line of the present invention together with a dispersion characteristic of the dispersion compensating optical fiber and a single-mode optical fiber which are connected to each other.

FIG. 3 shows a measurement result of the dispersion characteristic of the optical transmission line of the present invention that is formed by connecting the dispersion compensating optical fiber of the present invention to the single-mode optical fiber. The measurement result is indicated by the solid line. The dispersion compensating optical fiber of concrete example 3 shown in Table 6 is used here, and is connected to the single-mode optical fiber so as to form a continuous long optical transmission line. In practice, the dispersion characteristic of the optical transmission line exhibits substantially the same tendency both in the case of the dispersion compensating optical fiber of the first embodiment and in the case of the dispersion compensating optical fiber of the second embodiment. FIG. 3 shows a typical dispersion characteristic. In FIG. 3, the dispersion characteristic of the dispersion compensating optical fiber connected to the single-mode optical fiber is indicated by the alternate long and short dashed line, and the dispersion characteristic of the single-mode optical fiber that has zero dispersion in the 1.3 μm-wavelength band is indicated by the chain line.

As is apparent from FIG. 3, the absolute value of the dispersion value is within 1 ps/nm/km in a wide range of wavelengths of almost 1450 nm through 1600 nm, and an almost constant low dispersion characteristic is obtained in the range of 1500 nm through 1565 nm.

It is noted that the present invention is not limited to the aforementioned embodiments and can have various aspects. For example, the dispersion compensating optical fiber of each of the aforementioned embodiments was described as having the refractive-index profile shown in FIG. 1, but the refractive-index profile of the dispersion compensating optical fiber according to the present invention is not limited to the above and is to be determined appropriately.

In detail, what is required of the dispersion compensating optical fiber of the present invention is to have a characteristic in which the dispersion value in a predetermined wavelength band in the 1.5 μm-wavelength band of the connected optical fiber is set at −1 ps/nm/km through 1 ps/nm/km by connecting the compensating optical fiber to the single-mode optical fiber, and, additionally, is to have any one of the characteristics ①, ②, and ③ at least either in a wavelength in the vicinity of the center of the predetermined wavelength band in the 1.5 μm-wavelength band (i.e., wavelengths 1520 nm through 1620 nm) or in the predetermined wavelength band in the 1.5 μm-wavelength band, or is to have a characteristic in which the dispersion value in a predetermined wavelength in, for example, the 1.3 μm-wavelength band of the connected optical fiber is set at −5 ps/nm/km through 5 ps/nm/km. The dispersion compensating optical fiber of the present invention may have a refractive-index profile in which the refractive index of the first side core 2 is set to be the same as the refractive index of the cladding 5 in FIG. 1, or may have a W-type refractive-index profile that omits the second side core.

If the dispersion compensating optical fiber of the present invention is designed to have the characteristic of compensating a dispersion slope in a predetermined wavelength band in the 1.5 μm-wavelength band by making the dispersion slope therein negative and by connecting it to the single-mode optical fiber, it is possible to compensate both the dispersion and the dispersion slope of the single-mode optical fiber in the predetermined wavelength band in the 1.5 μm-wavelength band almost completely and use an optical transmission line formed by the connection between the single-mode optical fiber and the dispersion compensating optical fiber so making high-quality WDM transmission for optical communications in the predetermined wavelength band in the 1.5 μm-wavelength band.

Additionally, if the dispersion compensating optical fiber of the present invention is designed to compensate for the dispersion slope in the 1.3 μm-wavelength band by making the dispersion slope in the 1.3 μm-wavelength band negative and by connecting it to the single-mode optical fiber, it is possible to compensate for the dispersion slope of the single-mode optical fiber in the 1.3 μm-wavelength band and use an optical transmission line formed by the connection between the single-mode optical fiber and the dispersion compensating optical fiber so making high-quality WDM transmission also in the 1.3 μm-wavelength band.

In the dispersion compensating optical fiber of the second embodiment, the dispersion value in the predetermined wavelength band in the 1.5 μm-wavelength band of the connected optical fiber was set at −1 ps/nm/km through 1 ps/nm/km, and the dispersion value in the 1.3 μm-wavelength band of the connected optical fiber was set at −5 ps/nm/km through 5 ps/nm/km by the connection of the compensating optical fiber to the single-mode optical fiber. However, the dispersion compensating optical fiber of the present invention may be designed to have the dispersion value of −5 ps/nm/km through 5 ps/mm/km in one or more predetermined wavelength bands different from the 1.5 μm-wavelength band and other than the 1.3 μm-wavelength band.

As mentioned above, the optical transmission line of this embodiment was formed by the direct fusion splice between the single-mode optical fiber and the dispersion compensating optical fiber. Instead, when the dispersion compensating optical fiber whose mode field diameter in the 1.5 μm-wavelength band is relatively small is connected to the single-mode optical fiber, it is possible to, between the dispersion compensating optical fiber and the single-mode optical fiber, interpose a dispersion shift optical fiber, for example, whose length is 1/1000 times or less as long as the single-mode optical fiber or the dispersion compensating optical fiber and whose mode field diameter in the 1.5 μm-wavelength band is larger than that of the dispersion compensating optical fiber or is less than that of the single-mode optical fiber or that of a compensated optical fiber.

Thereby, the connection loss between the dispersion compensating optical fiber and the single-mode optical fiber can be prevented from increasing because the mode field diameter of the dispersion compensating optical fiber is different from that of the single-mode optical fiber. Additionally, since the length of the dispersion shift optical fiber interposed therebetween is short, the interposition thereof makes it possible to form an optical transmission line by which high-quality WDM optical transmission can be made without losing the other characteristics such as optical transmission loss.

In each of the aforementioned embodiments, a description was given of the case where the dispersion compensating optical fiber is connected to the single-mode optical fiber. However, the dispersion compensating optical fiber of the present invention may be connected to, instead of the single-mode optical fiber, a compensated optical fiber whose dispersion characteristic in the 1.5 μm-wavelength band is almost the same as that of the single-mode optical fiber. And, the optical transmission line of the present invention may be formed by connecting the dispersion compensating optical fiber to the compensated optical fiber.

INDUSTRIAL APPLICABILITY

As mentioned above, the dispersion compensating optical fiber and the optical transmission line using the dispersion compensating optical fiber according to the present invention compensate for the dispersion in the 1.5 μm-wavelength band that is transmitted through a single-mode optical fiber or an optical fiber having the same dispersion characteristics as the single-mode optical fiber, and reduce the dispersion even in a wavelength band (1.3 μm-wavelength band, for example) other than the 1.5 μm-wavelength band, and, at the same time, restrict the waveform distortion so as to facilitate the construction of the optical transmission line for making high-quality wide-range WDM transmission.

What is claimed is:

1. A dispersion compensating optical fiber used by connection to a single-mode optical fiber that has zero dispersion in the vicinity of a wavelength of 1.3 μm or by connection to a compensated optical fiber whose dispersion characteristic in a 1.5 μm-wavelength band is substantially the same as that of the single-mode optical fiber, said dispersion compensating optical fiber characterized in that a dispersion value in a predetermined wavelength band in the 1.5 μm-wavelength band of a connected optical fiber is set at −1 ps/nm/km through 1 ps/nm/km, and a dispersion value in one or more predetermined wavelength bands different from the predetermined wavelength band in the 1.5 μm-wavelength band is set at −5 ps/nm/km through 5 ps/nm/km.

2. The dispersion compensating optical fiber of claim 1 characterized in that the predetermined wavelength band, different from the 1.5 μm-wavelength band, in which the dispersion value of the connected optical fiber is set at −5 ps/nm/km through 5 ps/nm/km is a 1.3 μm-wavelength band.

3. A dispersion compensating optical fiber characterized in that a mode field diameter in a predetermined wavelength band in a 1.5 μm-wavelength band or a mode field diameter in a wavelength in the vicinity of a center of the predetermined wavelength band is 6.3 μm or more, and, by connection to a single-mode optical fiber that has zero dispersion in the vicinity of a wavelength of 1.3 μm or by connection to a compensated optical fiber whose dispersion characteristic in the 1.5 μm-wavelength band is substantially the same as that of the single-mode optical fiber, a dispersion value in the predetermined wavelength band in the 1.5 μm-wavelength band of a connected optical fiber is set at −1 ps/nm/km through 1 ps/nm/km.

4. A dispersion compensating optical fiber characterized in that a mode field diameter in a predetermined wavelength band in a 1.5 μm-wavelength band or a mode field diameter in a wavelength in the vicinity of a center of the predetermined wavelength band is 5.5 μm or more, and a bend loss in a bend diameter of 20 mm in the predetermined wavelength band or in the wavelength in the vicinity of the center of the predetermined wavelength band is 3.0 dB/m or less, and, by connection to a single-mode optical fiber that has zero dispersion in the vicinity of a wavelength of 1.3 μm or by connection to a compensated optical fiber whose dispersion characteristic in the 1.5 μm-wavelength band is substantially the same as that of the single-mode optical fiber, a dispersion value in the predetermined wavelength band in the 1.5 μm-wavelength band or in the vicinity of the center of the predetermined wavelength band of a connected optical fiber is set at −1 ps/nm/km through 1 ps/nm/km.

5. The dispersion compensating optical fiber of any one of claims 1 to 4, characterized in that a dispersion value in the predetermined wavelength band in the 1.5 μm-wavelength band or a dispersion value in the wavelength in the vicinity of the center of the predetermined wavelength band is −20 ps/nm/km through −10 ps/nm/km, and a transmission loss in the predetermined wavelength band or in the wavelength in the vicinity of the center of the predetermined wavelength band is 0.25 dB/km or less, and, by connection to the single-mode optical fiber that has zero dispersion in the vicinity of a wavelength of 1.3 μm or by connection to the compensated optical fiber whose dispersion characteristic in the 1.5 μm-wavelength band is substantially the same as that of the single-mode optical fiber, a dispersion value in the predetermined wavelength band in the 1.5 μm-wavelength band or in the vicinity of the center of the predetermined wavelength band of the connected optical fiber is set at −1 ps/nm/km through 1 ps/nm/km.

6. The dispersion compensating optical fiber of any one of claims 1 to 4, characterized in that a dispersion slope either in the predetermined wavelength in the 1.5 μm-wavelength band or in the 1.3 μm-wavelength band or a dispersion slope both in the predetermined wavelength in the 1.5 μm-wavelength band and in the 1.3 μm-wavelength band is negative.

7. The dispersion compensating optical fiber of claim 5, characterized in that a dispersion slope either in the predetermined wavelength in the 1.5 μm-wavelength band or in the 1.3 μm-wavelength band or a dispersion slope both in the predetermined wavelength in the 1.5 μm-wavelength band and in the 1.3 μm-wavelength band is negative.

8. The dispersion compensating optical fiber of any one of claims 1 to 4, characterized in that a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band in the 1.5 μm-wavelength band or in the wavelength in the vicinity of the center of the predetermined wavelength band is set to be 20 dB/m or less.

9. The dispersion compensating optical fiber of claim 5, characterized in that a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band in the 1.5 μm-wavelength band or in the wavelength in the vicinity of the center of the predetermined wavelength band is set to be 20 dB/m or less.

10. The dispersion compensating optical fiber of claim 6, characterized in that a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band in the 1.5 μm-wavelength band or in the wavelength in the vicinity of the center of the predetermined wavelength band is set to be 20 dB/m or less.

11. The dispersion compensating optical fiber of claim 7, characterized in that a transmission loss in the predetermined wavelength band in the 1.5 μm-wavelength band or in the wavelength in the vicinity of the center of the predetermined wavelength band is set to be 0.30 dB/km or less, and a polarization mode dispersion value in the predetermined wavelength band or in the wavelength in the vicinity of the center of the predetermined wavelength band is set to be 0.15 ps/km$^{1/2}$ or less, and a bend loss in a bend diameter of 20 mm in the predetermined wavelength band in the 1.5 μm-wavelength band or in the wavelength in the vicinity of the center of the predetermined wavelength band is set to be 20 dB/m or less.

12. The dispersion compensating optical fiber of any one of claims 1 to 4, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 \Delta 2$, and $0.8\% \leq \Delta 1 \leq 1.3\%$, $-0.4\% \leq \Delta 2 \leq -0.2\%$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

13. The dispersion compensating optical fiber of claim 5, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > 2$, and $0.8\% \leq \Delta 1 \leq 1.3\%$, $-0.4\% \leq \Delta 2 \leq -0.2\%$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

14. The dispersion compensating optical fiber of claim 6, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 \Delta 2$, and $0.8\% \leq \Delta 1 \leq 1.3\%$, $-0.4\% \leq \Delta 2 \leq -0.2\%$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

15. The dispersion compensating optical fiber of claim 8, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 \Delta 2$, and $0.8\% \leq \Delta 1 \leq 1.3\%$, $-0.4\% \leq \Delta 2 \leq -0.2\%$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

16. The dispersion compensating optical fiber of claim 7 or claim 9 or claim 10 or claim 11, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.4\% \leq \Delta 2 \leq -0.2\%$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

17. The dispersion compensating optical fiber of any one of claims 1 to 4, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.5 \leq \Delta 2/\Delta 1 \leq -0.35$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

18. The dispersion compensating optical fiber of claim 5, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.5 \leq \Delta 2/\Delta 1 \leq -0.35$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

19. The dispersion compensating optical fiber of claim 6, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.5 \leq \Delta 2/\Delta 1 \leq -0.35$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

20. The dispersion compensating optical fiber of claim 8, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.5 \leq \Delta 2/\Delta 1 \leq -0.35$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

21. The dispersion compensating optical fiber of claim 7, or claim 9, or claim 10, or claim 11, characterized in that the dispersion compensating optical fiber is formed by covering an outer side of a center core with a first side core, covering an outer side of the first side core with a second side core, and covering an outer side of the second side core with a cladding, and the relations $\Delta 1 > \Delta 3 > \Delta 2$, and $0.8\% \leq \Delta 1 \leq 1.3\%$, $-0.5 \leq \Delta 2/\Delta 1 \leq -0.35$, and $0.2\% \leq \Delta 3 \leq 0.3\%$ are established wherein $\Delta 1$ is a comparative refractive index difference of the center core to the cladding, $\Delta 2$ is a comparative refractive index difference of the first side core to the cladding, and $\Delta 3$ is a comparative refractive index difference of the second side core to the cladding, and an outer diameter of the first side core is 2 through 2.5 times as large as an outer diameter of the center core, and an outer diameter of the second side core is 2.5 through 3.5 times as large as the outer diameter of the center core.

22. An optical transmission line characterized in that the optical transmission line is formed by connecting the dispersion compensating optical fiber of claim 11 to the single-mode optical fiber that has zero dispersion in the vicinity of a wavelength of 1.3 µm or to the compensated optical fiber whose dispersion characteristic in the 1.5 µm-wavelength band is substantially the same as that of the single-mode optical fiber, and a dispersion value in a predetermined wavelength band in the 1.5 µm- wavelength band is −1 ps/nm/km through 1 ps/nm/km.

23. The optical transmission line of claim 22, characterized in that a dispersion value in one or more predetermined wavelength bands different from the 1.5 μm-wavelength band is −5 ps/nm/km through 5 ps/nm/km.

24. The optical transmission line of claim 23, characterized in that a dispersion value in the 1.3 μm-wavelength band is −5 ps/nm/km through 5 ps/nm/km.

25. The optical transmission line of claim 22, characterized in that the dispersion compensating optical fiber is connected by fusion splice to the single-mode optical fiber that has zero dispersion in the vicinity of a wavelength of 1.3 μm or to the compensated optical fiber whose dispersion characteristic in the 1.5 μm-wavelength band is substantially the same as that of the single-mode optical fiber, and a fusion splice loss is 0.4 dB or less.

26. The optical transmission line of claim 22, characterized in that the dispersion compensating optical fiber is connected to the single-mode optical fiber that has zero dispersion in the vicinity of a wavelength of 1.3 μm or to the compensated optical fiber whose dispersion characteristic in the 1.5 μm-wavelength band is substantially the same as that of the single-mode optical fiber, with a dispersion shift optical fiber that has zero dispersion in the 1.5 μm-wavelength band interposed between the dispersion compensating optical fiber and the single-mode optical fiber or the compensated optical fiber, and a length of the dispersion shift optical fiber is 1/1000 times or less as long as the single-mode optical fiber or the compensated optical fiber connected to the dispersion compensating optical fiber, and a mode field diameter in the 1.5 μm-wavelength band of the dispersion shift optical fiber is larger than that of the dispersion compensating optical fiber and less than that of single-mode optical fiber or that of the compensated optical fiber.

27. The optical transmission line of claim 25, characterized in that the dispersion compensating optical fiber is connected to the single-mode optical fiber that has zero dispersion in the vicinity of a wavelength of 1.3 μm or to the compensated optical fiber whose dispersion characteristic in the 1.5 μm-wavelength band is substantially the same as that of the single-mode optical fiber, with a dispersion shift optical fiber that has zero dispersion in the 1.5 μm-wavelength band interposed between the dispersion compensating optical fiber and the single-mode optical fiber or the compensated optical fiber, and a length of the dispersion shift optical fiber is 1/1000 times or less as long as the single-mode optical fiber or the compensated optical fiber connected to the dispersion compensating optical fiber, and a mode field diameter in the 1.5 μm-wavelength band of the dispersion shift optical fiber is larger than that of the dispersion compensating optical fiber and less than that of single-mode optical fiber or that of the compensated optical fiber.

* * * * *

UNITED STATES PATENT AND TRADEMARK OFFICE
CERTIFICATE OF CORRECTION

PATENT NO.   : 6,591,048 B2  Page 1 of 1
DATED        : July 8, 2003
INVENTOR(S)  : Kazunori Mukasa It is certified that error appears in the above-identified patent and that said Letters Patent is hereby corrected as shown below:

<u>Title page,</u>
Item [63], Related U.S. Application Data, should read:
-- Continuation of application No. PCT/JP00/04093, filed on Jun. 22, 2000. --;
Item [56], References Cited, should include:
U.S. PATENT DOCUMENTS
5,448,674    9/5/95      Vengsarkar et al.
5,802,234    9/1/98      Vengsarkar et al.
5,838,867    11/17/98    Onishi et al.

FOREIGN PATENT DOCUMENTS
JP10-325913    12/8/98     Japan
JP10-206659    8/7/98      Japan
JP10-319266    12/4/98     Japan
EP 779524      6/18/97     Europe
WO 98/04941    2/5/98      WIPO
WO 00/25158    5/4/00      WIPO
WO 00/17684    3/30/00     WIPO OTHER PUBLICATIONS
Mukasa, K., et al.: Novel Network Fiber to Manage Dispersion at 1.55 µm with Combination of 1.3 µm Zero Dispersion Single Mode Fiber; 23$^{rd}$ European Conference on Optical Communications, Vol. 1, 22-25, Sept. 1997, Conference Publication No. 448, pp. 127-130.
Semenov, V.A., et al.: Broadband dispersion-compensating fiber for high-bit-rate transmission network use: Applied Optics, Aug. 20, 1995, Vol. 34, No. 24, pp. 5331-5337
Vengsarkar, A.M., et al.: Fundamental-mode dispersion-compensating fibers: design. considerations and experiments; conference on Optical Fiber Communication, 20-25 Feb. 1994, Technical Digest, Vol. 4, pp, 225-227

Signed and Sealed this

Twenty-seventh Day of January, 2004

JON W. DUDAS
*Acting Director of the United States Patent and Trademark Office*